Nov. 29, 1966 J. C. WINSLOW ET AL 3,287,955
TOOL FOR SETTING RINGS
Filed April 20, 1965 6 Sheets-Sheet 1
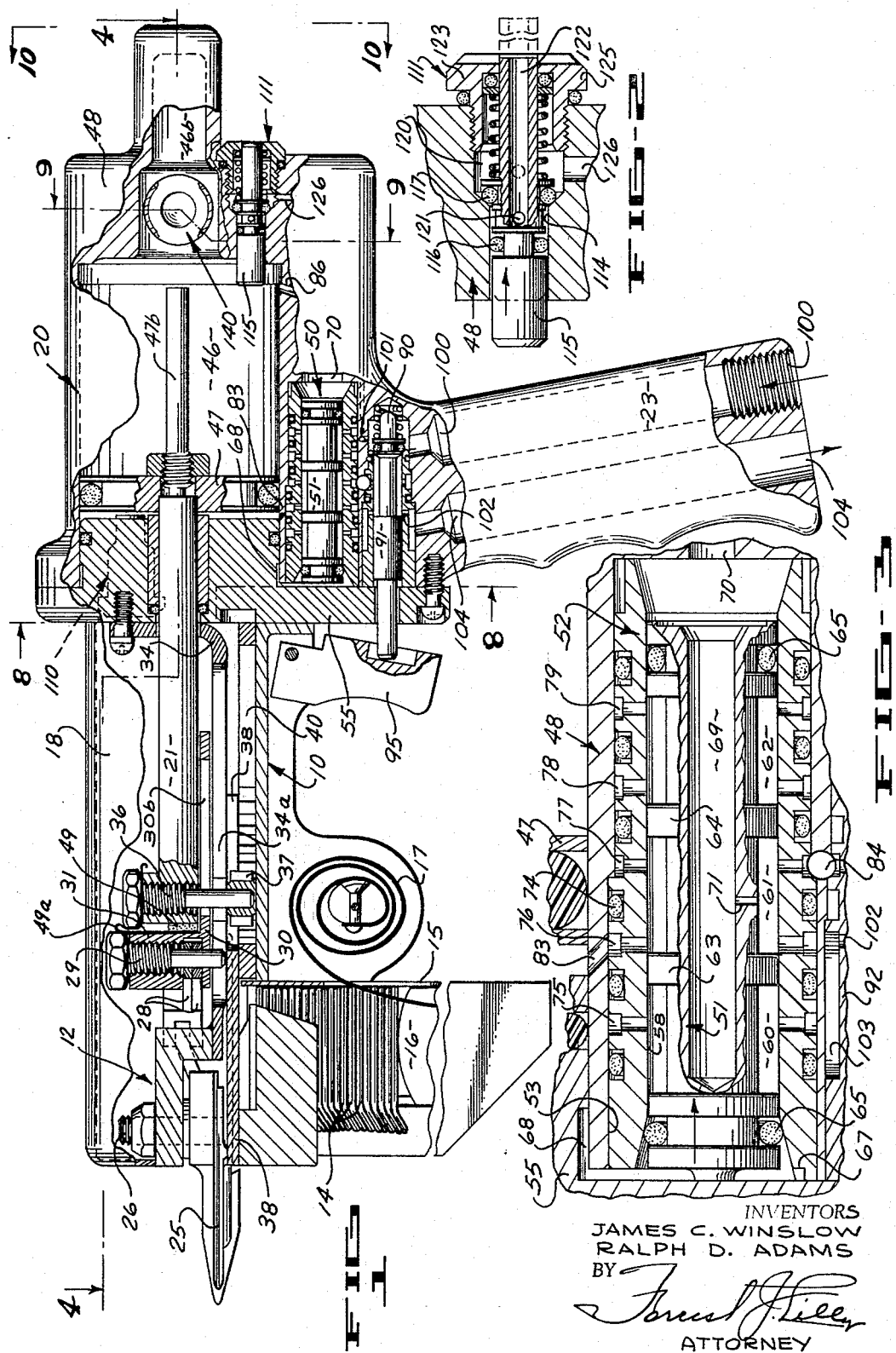
INVENTORS
JAMES C. WINSLOW
RALPH D. ADAMS
BY
ATTORNEY

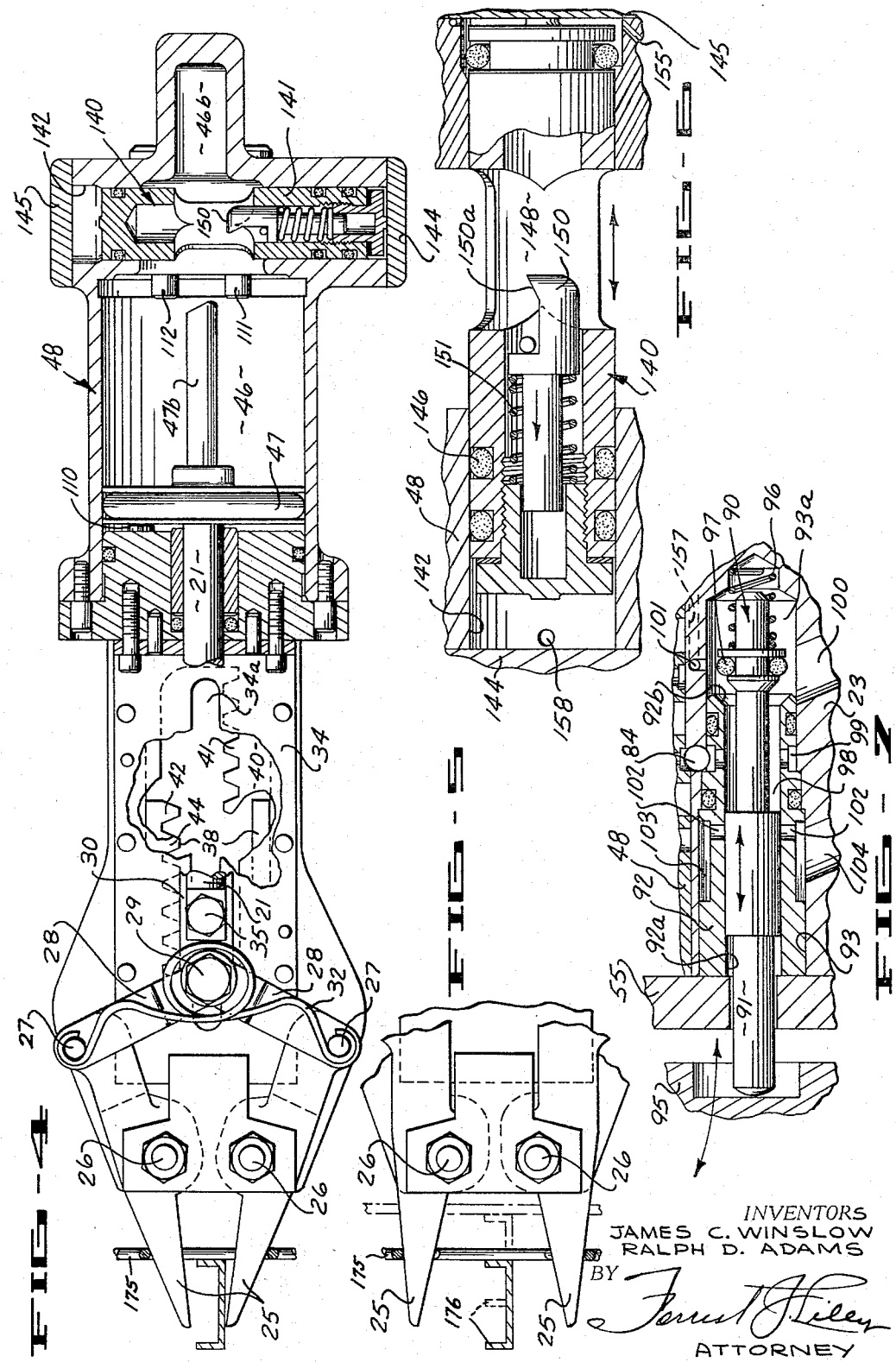

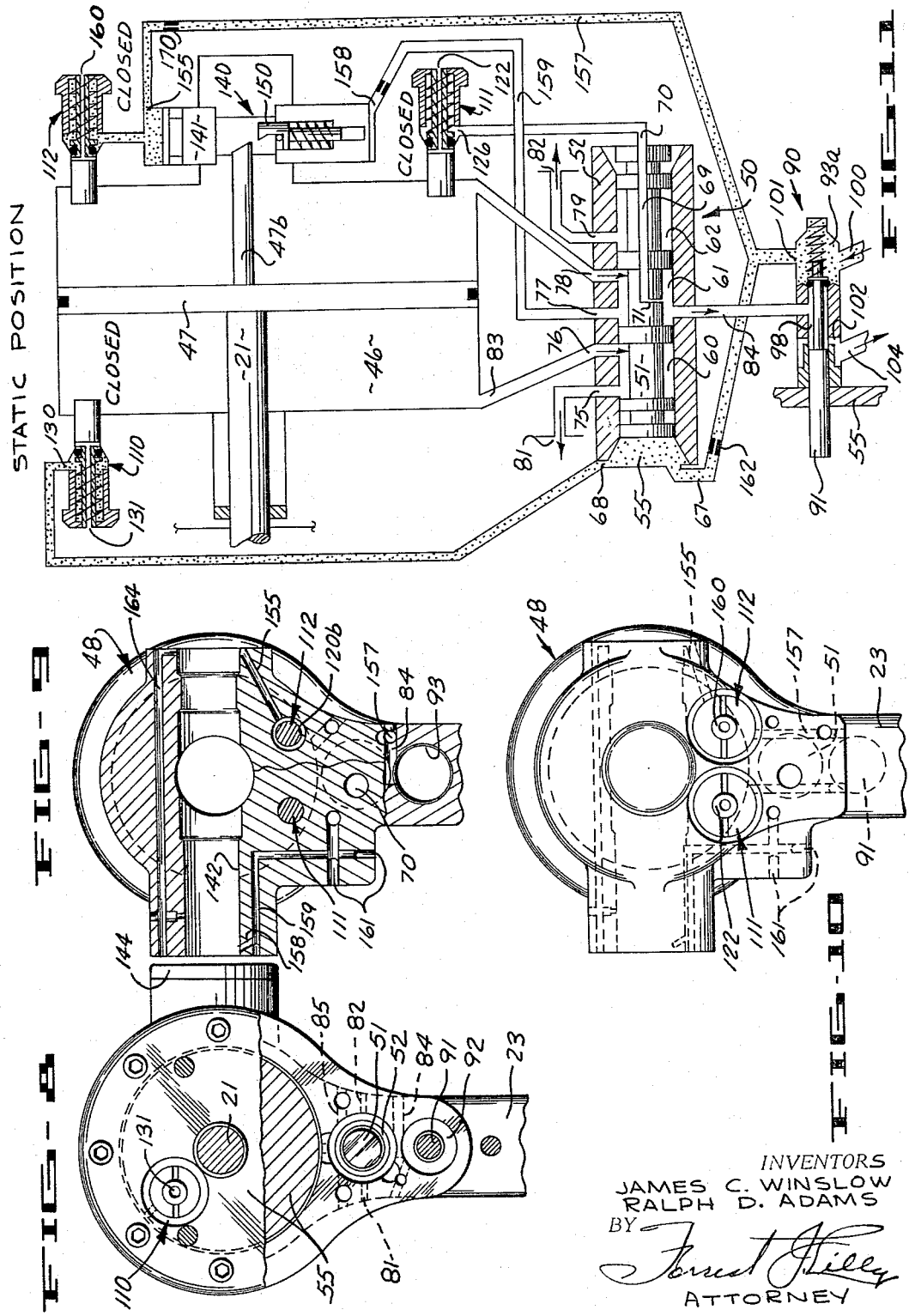
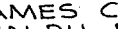

Nov. 29, 1966  J. C. WINSLOW ET AL  3,287,955
TOOL FOR SETTING RINGS
Filed April 20, 1965  6 Sheets-Sheet 4
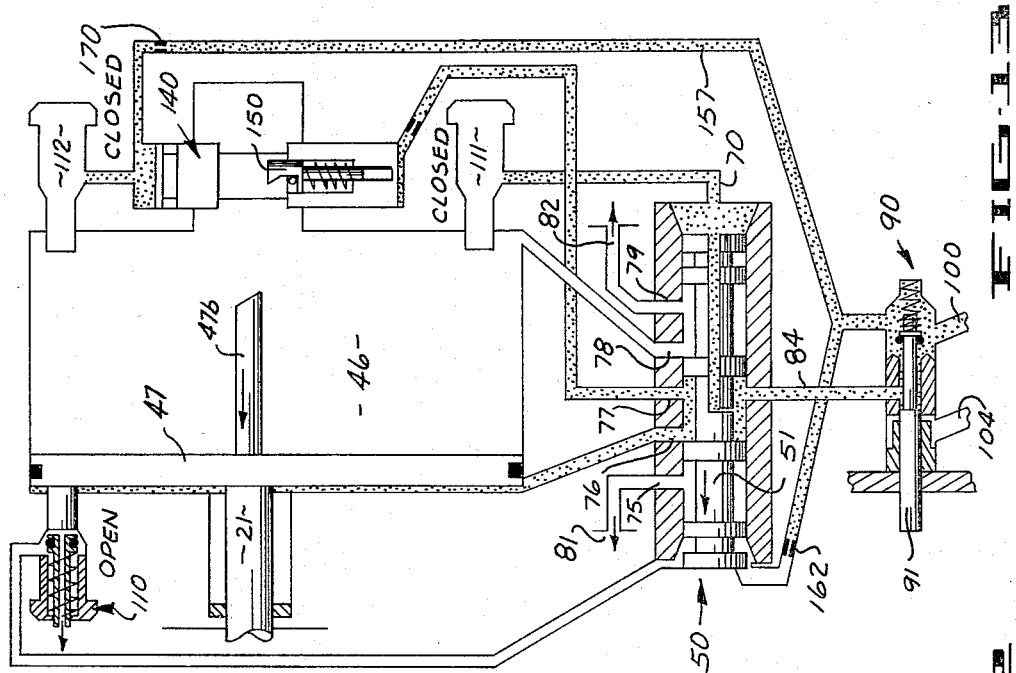
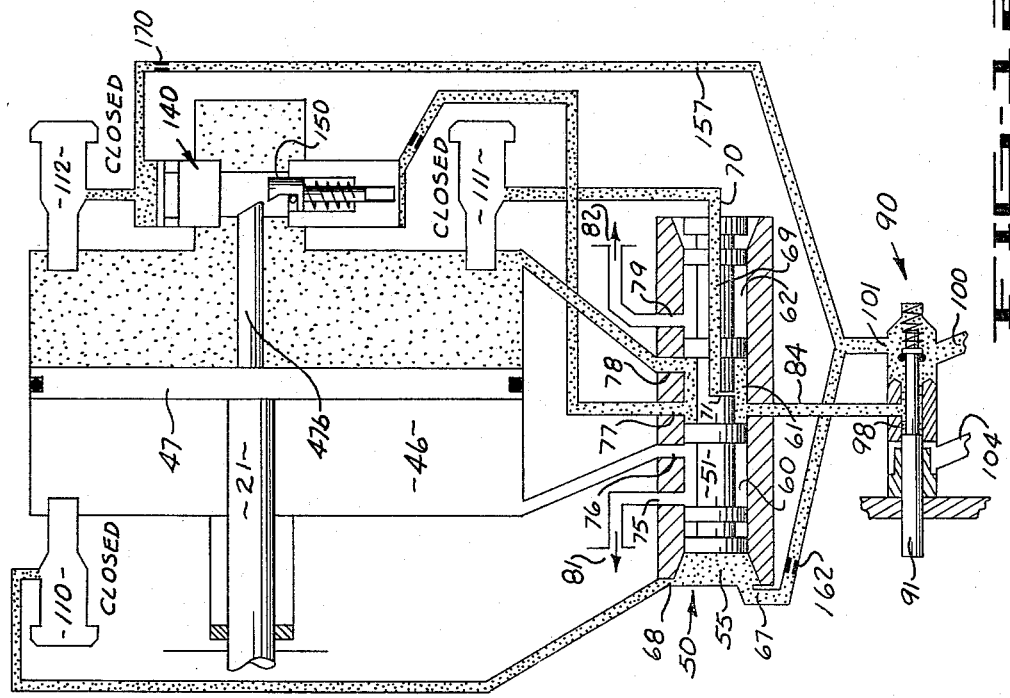
INVENTORS
JAMES C. WINSLOW
RALPH D. ADAMS
BY 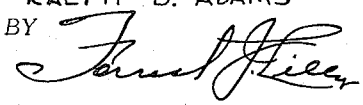
ATTORNEY

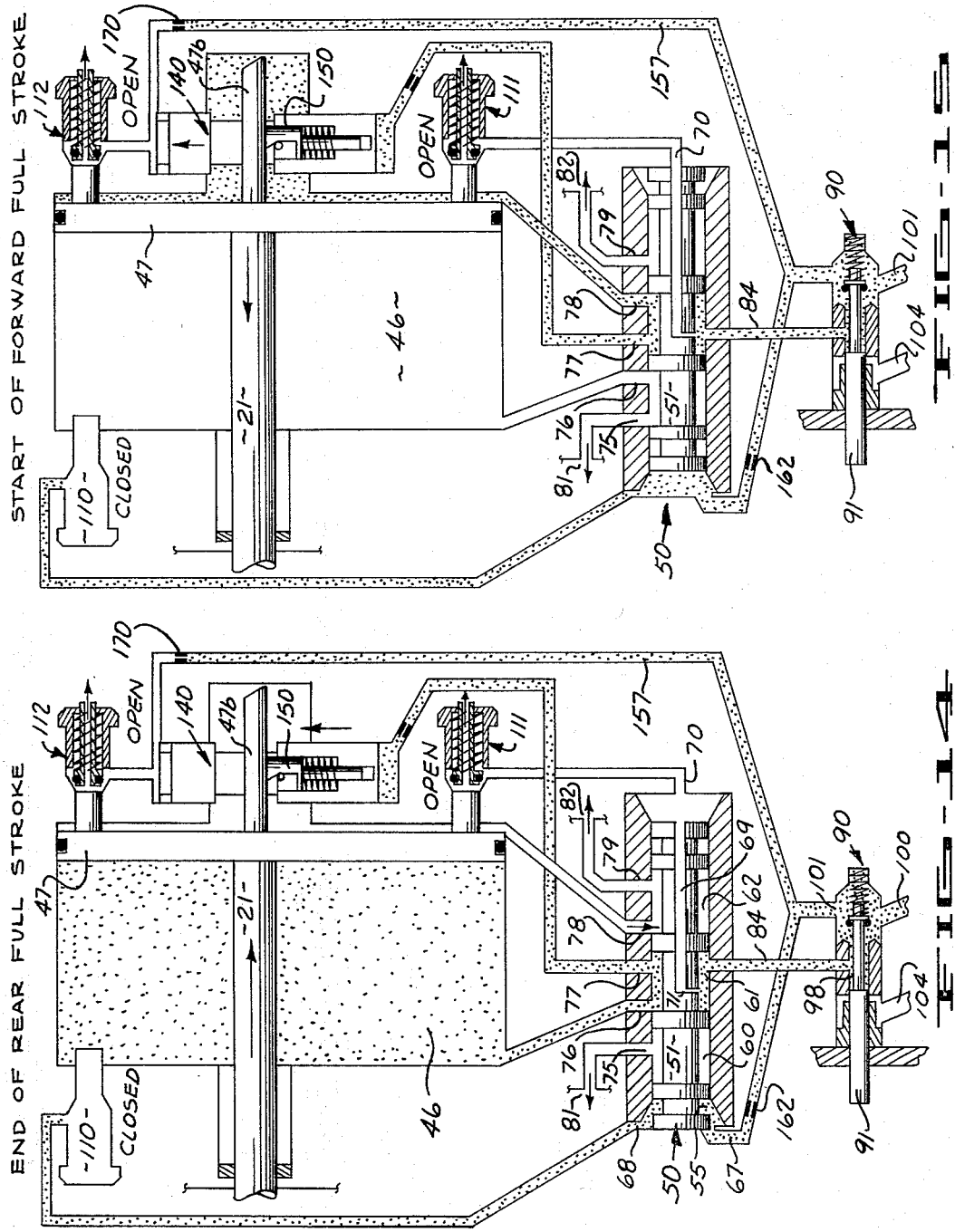

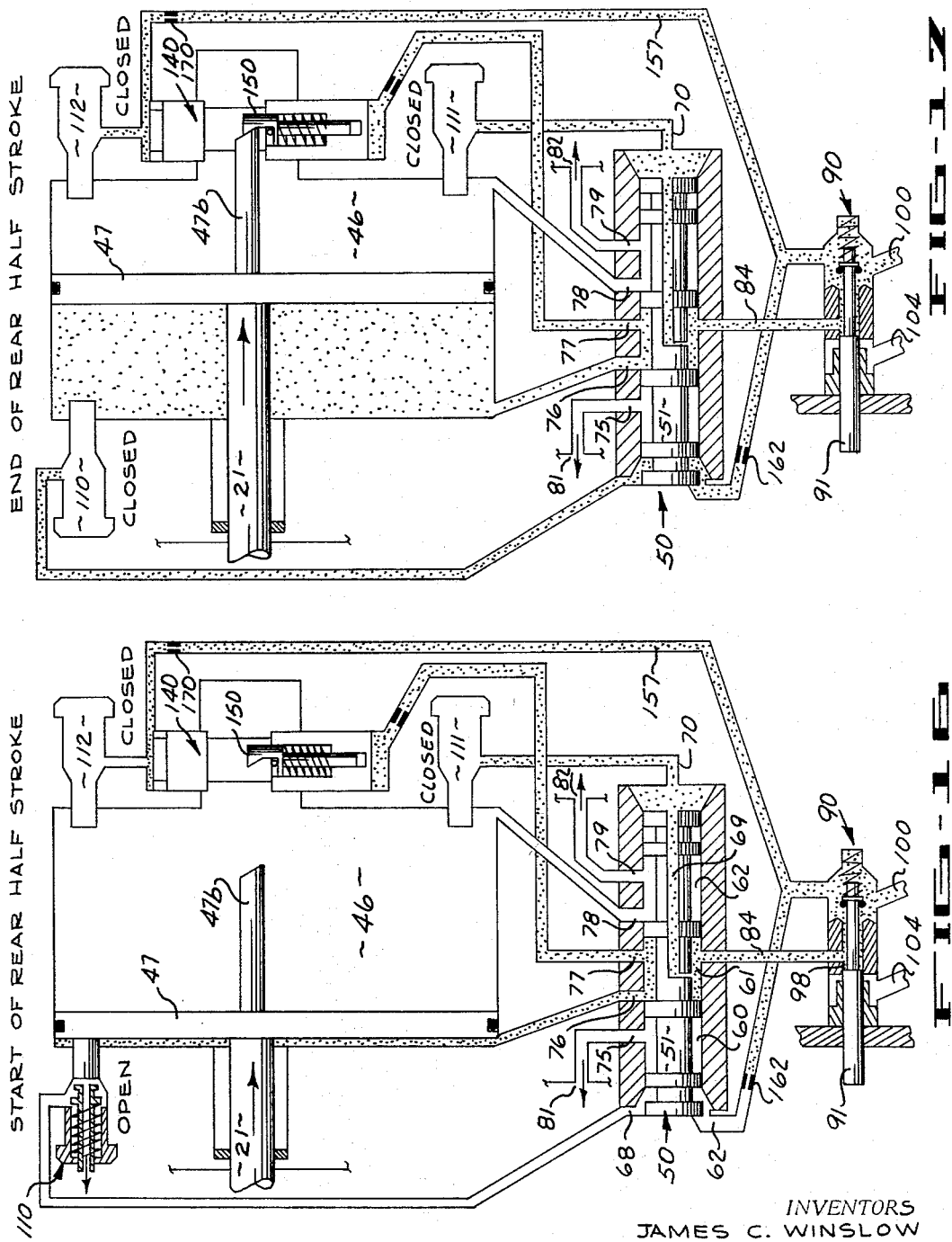

United States Patent Office 3,287,955
Patented Nov. 29, 1966

3,287,955
TOOL FOR SETTING RINGS
James C. Winslow, Sierra Madre, and Ralph D. Adams, Glendora, Calif., assignors to Winslow Product Engineering Corporation, Arcadia, Calif., a corporation of California
Filed Apr. 20, 1965, Ser. No. 449,449
20 Claims. (Cl. 72—407)

The present invention relates generally to a tool for driving and setting staples or rings; and more particularly to a tool of this character having a novel type of air motor and valve mechanism controlling the operation thereof to produce a novel four-stroke cycle.

One use of a driving tool of this particular type is to set and clinch rings which fasten metal lath or the like to the supporting metal angles or channels. The mesh or opening size of expanded metal lath differs with the various manufacturers and the particular purpose or weight of material used. Thus the openings through which the jaws of the driving tool pass to operate have a substantial range of sizes, with the result that one pair of jaws cannot be designed to fit all sizes of metal lath that will be encountered.

The jaws of the setting tool are moved to the extended or fully spread apart position to receive a ring; and in tools heretofore known, the jaws have been in this position at the beginning of an operating cycle. However, when a small mesh lath is encountered, the jaws may then be too wide to permit them to be inserted fully in the mesh to the extent necessary to set a ring around a lath supporting member. The effect is to limit the usefulness of a given tool to a small range of mesh sizes of the lath; or, conversely, to require a plurality of tools with different jaw sizes to work on the different sizes of lath normally encountered.

The mesh size also poses a problem when it is not aligned with the supporting member in a manner to allow the tool to properly clinch a ring.

It has been discovered that these problems can be eliminated if the lath openings can be enlarged by spreading apart or breaking the ribbons defining these openings in the lath. In this way, the enlarged openings permit the jaws to be fully inserted in the lath to place the rings properly around the lath and the supporting members.

Thus it becomes a general object of the present invention to design a tool for driving and setting rings which is also adapted to enlarge the openings with the ring setting jaws before receiving and clinching the ring.

It is also a general object of the present invention to provide a ring driving and clinching tool in which the jaws are operated through a cycle of expansion and contraction prior to the time that they are spread apart to pick up and advance the ring, after which they clinch the ring.

It is a further object of the present invention to provide a motor means and valve control mechanism therefor of novel design which causes the ring clinching assembly to be automatically operated through a multiple-stroke cycle comprising more than the usual two strokes.

These and other objects of the invention are achieved by providing a tool of the character described comprising a frame on which there is mounted a ring clinching assembly, such assembly including a pair of pivoted jaws adapted to receive and clinch a ring upon reciprocation of an element of the assembly. Motor means are provided for actuating the assembly, such motor means comprising a double-acting piston within a cylinder responsive to thrust on the piston exerted by operating air under pressure. The piston is operatively connected to the clinching assembly. Means are provided for operating the jaws through a preliminary cycle of opening and closing prior to receiving a ring, after which the normal cycle of opening and closing the jaws is performed to enable them to receive and clinch a ring. Such means include means for automatically reversing the motor means during the operation in order to operate the motor automatically through a four-stroke cycle whereby during the initial portion of the motor cycle, the jaws are actuated to open and close them for entry into the openings of the wire mesh and to operate upon the elements or wires of the metal lath in a manner to enlarge the openings therein prior to the time that the rings are inserted into the jaws. The later portion of the motor cycle operates the jaws to receive between them a ring and to clinch the ring in place. Manually operated means in the form of a pilot valve are provided for initiating the motor cycle, and the motor is stopped automatically at the end of its cycle by lock means which stop the piston at a point intermediate the ends of its range of travel so that the complete four-stroke cycle of the motor includes two short strokes and two full range strokes.

How the above objects and advantages of the present invention, as well as others not specifically mentioned herein, are achieved will be more readily understood by reference to the following description and to the annexed drawings, in which:

FIG. 1 is a combined side elevation and longitudinal median section of a ring driving and clinching tool embodying a presently preferred form of the invention;

FIG. 2 is an enlarged fragmentary portion of FIG. 1 showing in detail a typical exhaust valve in closed position;

FIG. 3 is an enlarged fragmentary section through the shuttle valve controlling air supply to the motor piston, with the spool of the valve in forward position;

FIG. 4 is a combined plan and longitudinal section on line 4—4 of FIG. 1, the protective housing over the jaws being removed for purposes of illustration;

FIG. 5 is a fragmentary plan view of the jaws showing them in expanded position;

FIG. 6 is a longitudinal section through the motor piston lock mechanism;

FIG. 7 is an enlarged fragmentary section in the plane of FIG. 1 showing the pilot valve in open positions;

FIG. 8 is a combined section and end elevation of the air motor housing viewed from the front end thereof on line 8—8 of FIG. 1;

FIG. 9 is a transverse section through the motor housing only on line 9—9 of FIG. 1 illustrating the location and typical construction of certain air passages in the motor housing;

FIG. 10 is a rear end elevation of the motor housing alone viewed from the right of FIG. 1; and FIGS. 11-17 are diagrams showing the positions occupied by various parts at different times during a complete operating cycle, starting with the initial starting or static position in FIG. 11 and terminating in FIG. 17 at the end of the operating cycle.

Reerring now to the drawings, and particularly to FIG. 1, it will be seen that the principal parts of the tool are a stationary frame indicated generally at 10 on which is slidably mounted the clinching assembly 12 by which the rings are set and clinched. The rings 14 are contained in a stack held in magazine 15 and urged upwardly by follower 16 into position to be received by the clinching assembly. Coil spring 17 moves follower 16 upwardly within the magazine. The assembly 12 is optionally covered by a removable guard 18 mounted on frame 10.

For purposes of description, the left-hand end of the tool as illustrated in FIG. 1 will be designated as the forward end as this is the end that is brought into contact with the work and the end at which the rings are set and clinched. Likewise, the right-hand end of the tool is designated as the rearward end, which is the end normally nearer the operator. Hence, the motor means indicated generally at 20 is located rearwardly of the ring clinching assembly 12 and is connected thereto by connecting rod 21 for operation of the assembly. The tool is portable or hand held and is accordingly provided with a pistol grip type handle 23 which is beneath and preferably formed integrally with the housing of motor means 20.

The ring clinching assembly 12 comprises a pair of cooperating jaws 25 which are individually pivoted at 26 (FIG. 4) to the frame. At its rear end, each jaw 25 is pivotally connected at 27 to one end of one of a pair of toggle links 28. The two toggle links 28 are pivotally interconnected by toggle pin 29 which is threaded into an upright post 31 which is integral with and located at the forward end of slide 30. The slide is designed to reciprocate relative to the stationary frame, as will become apparent; and in so doing, the slide advances and retracts toggle pin 29. These motions of the pin 29, respectively, cause jaws 25 to move toward and away from each other as shown in FIGS. 4 and 5. A bow wire spring 32 is connected at both ends to pins 27 and at its center to pin 29 in order to bias jaws 25 toward the open position, the spring tending to draw pins 27 toward each other and to retract pin 29 rearwardly from the position of FIG. 1.

Pin 29, as may be seen in FIG. 1, extends through and below slide 30 to enter into slot 34a in top plate 34 of the frame 10. Slot 34a extends longitudinally of the frame and by extending into this slot, pin 29 acts as a guide for the forward end of slide 30. Slide 30 extends rearwardly from post 31 and is located immediately above frame plate 34; and the slide is provided with a longitudinally extending slot 30b which is utilized to assist in guiding slide 30.

Drive rod 21 is provided at its forward end with pin 36 which serves as a bearing upon which pinion 37 is rotatably mounted. Pin 36 has an upper portion which is threaded and is utilized to attach the pin to the forward end of drive rod 21; while the lower portion of the pin extends downwardly through vertically aligned slots 30b and 34a in the slide 30 and frame member 34, respectively, to assist in guiding slide 30 during reciprocating movement of the slide.

Pinion 37 carried by pin 36 serves as a mechanism for advancing ring feed plate 38 which pushes the top ring 14 off of the stack in magazine 15 and into the pair of jaws 25. For this purpose, there is provided a stationary double rack 40 attached to stationary frame 10. Rack 40 is provided with two sets of teeth 41 and 42, respectively, on opposite sides of a central opening as shown in FIG. 4, the teeth 42 being located forwardly of the set of teeth 41. Ring feed plate 38 is provided with a single set of teeth 44 forming a rack which is vertically aligned with teeth 42, as shown in FIG. 1, in which case the teeth of pinion 37 engage simultaneously both sets of teeth 42 and 44 and hold the ring feed plate locked to stationary rack 40.

However, when pinion 37 is at the rear end of the stroke, the teeth on the pinion engage at opposite sides of the pinion teeth 41 on the stationary rack and teeth 44 on the ring feed plate, causing the plate to advance during the early portion of the forward stroke of drive rod 21 because the pinion engages teeth 41 and until it disengages them and transfers to teeth 42. The pinion is always in engagement with teeth 44 on the ring feed plate 38.

The construction of the particular clinching assembly and the mechanism for feeding rings 14 in succession from the magazine into the jaws are both described in greater detail in Patent No. 3,066,304 granted December 4, 1962, to E. F. Wantland for "Driving Tool." Consequently, these elements are described here only in sufficient detail to provide an understanding of the entire tool and the novel type of motor means, it being understood that the motor means may be used in conjunction with other types of ring clinching assemblies and means for feeding rings into the jaws.

The motor means generally indicated at 20 is a fluid motor of the compressed air type and comprises a working cylinder 46 within which is located double-acting piston 47. Piston 47 is connected directly to drive rod 21, the drive rod extending forwardly through the front wall 55 of the cylinder. It will be appreciated that suitable sealing means, for example, O-rings, may be located at the positions shown, or elsewhere, in order to effect a fluid-tight seal between the piston and the cylinder walls, and between push rod 21 and the cylinder head, as well as other places throughout the motor means, all as will be understood by those skilled in the art. Cylinder 46 is located in a housing indicated generally at 48 and in which are located the several valves, described below, which control the operation of the motor means.

Piston 47 reciprocates within cylinder 46 for a total range of travel between its two extremes that is greater than the travel imparted to toggle pin 29 of the clinching assembly. Consequently, the coupling of the drive rod to the clinching assembly allows for relative movement of the drive rod with respect to the assembly, and this is the reason for the elongated slot 30b in the slide 30 connected to the toggle mechanism. Operation of the toggle mechanism will be commented on again later; but it will be noted here that it is desired to furnish the forward end of drive rod 21 with resilient bumper 49 on support spring 49a to absorb some of the shock of the forward movement of the drive rod as it engages the clinching assembly and also to permit relative overtravel of the drive rod in the event jaws 25 are prevented from closing fully.

Means are provided for automatically reversing the stroke of piston 47 of the motor during operation thereof in order to move the piston through a four-stroke cycle and thus obtain the desired cycle of operations of the clinching assembly. This means for controlling the operation of the fluid motor includes the shuttle valve mechanism indicated generally at 50 in FIG. 1 and illustrated in greater detail in FIG. 3.

The shuttle valve assembly comprises spool 51 which is slidably mounted within sleeve 52 for reciprocation relative to the sleeve. Sleeve 52 is mounted in a suitable bore 53 in motor housing 48, being inserted from the front end of the housing. The bore 53, like cylinder 46, (FIG. 8) is closed at its forward end by removable plate 55 which is suitably fastened to housing 48, as by a plurality of machine screws 56. In turn, plate 55 has mounted upon it stationary frame 10 carrying the clinching assembly to provide a rigid interconnection between the clinching assembly and the motor means.

Spool 51 is shorter than and reciprocates within bore 58 in sleeve 52. The spool has a plurality of external annular grooves at 60, 61 and 62 which are separated by intervening rings 63 and 64 that are a ground fit within bore 58 and thus serve to effectively isolate the several annular grooves from each other. Near each end, spool 51 carries sealing means, such as O-rings 65, which engage the wall of bore 58, thus making a fluid-tight fit with the bore wall and forming piston means at each end of the spool, the purpose of which will be more fully explained. The ends of bore 58 are preferably flared slightly in order to allow rings 65 to expand slightly and thereby lightly restrain the spool in either terminal position. As shown in FIG. 3, at the forward end of spool 51 there are two ports 67 and 68 for admission and exhaust of working fluid under pressure to the forward end of the spool.

The spool is provided with a longitudinally extending internal bore 69 which opens at the rear end of the spool to bore 58. This end of bore 69 is also in communication with port 70 in housing 48. Bore 69 is in communication with annular groove 61 through a small passageway 71 drilled radially through the body of the spool. The passage 71 is preferably made small enough to provide substantial restriction to the flow of fluid for reasons that later will become apparent.

Sleeve 52 is provided with a plurality of external, peripheral grooves in alternate ones of which are sealing means, such as O-rings 74. These O-rings serve to seal off from each other the intervening annular grooves 75, 76, 77, 78 and 79. Each of these annular grooves communicates with the interior bore 58 of the sleeve through one or more radial passages, as shown in FIG. 3.

The construction described of the spool and sleeve using external peripheral grooves and radial passages is a well known one in which the annular grooves act as manifolds to collect the fluid flow through one or more radial passages and, in turn, communicate with a port or passageway in a surrounding body, such as housing 48 containing the sleeve. This construction is not limitative on the invention but is adopted for practical reasons since the presence of the external annular grooves makes it unnecessary to effect exact angular orientation of the sleeve in the bore 53, the external grooves being aligned longitudinally with the desired ports in the motor housing 48 when the sleeve is fully inserted in the bore.

For example, grooves 75 and 79 communicate, respectively, with short, laterally extending horizontal passages 81 and 82, respectively, drilled in the housing and which open to the atmosphere. See FIGS. 8 and 11. Groove 76 communicates with port 83 which opens at its other end to the interior of piston cylinder 46 at a point ahead of piston 47. Groove 77 communicates with the pilot valve, later described, through port 84. Groove 78 communicates at port 85 (FIG. 8) which, through a suitably located passage 85a, is in communication with port 86 (FIG. 1) at the rear end of cylinder 46 beyond the piston 47 when it is at its extreme rear position.

Without considering the results thereof at this point in the description, it will be seen that spool 51 can occupy either one of two positions. The forward position is shown in FIG. 3 in which both external sleeve grooves 76 and 77 are in communication through internal annular groove 61 and sleeve grooves 78 and 79 are in communication through annular groove 62 of the spool. The spool can, under conditions which will be explained, be shifted to the rearward position as shown in FIG. 11. In this latter position, it will be seen that sleeve grooves 75 and 76 are in mutual communication through spool groove 60 and sleeve grooves 77 and 78 are in mutual communication through spool groove 61.

Means for initiating operation of the motor means is the manually operated pilot valve designated generally at 90 and shown in detail in FIG. 7. Pilot valve 90 comprises a plunger or valve member 91 slidably mounted in an internal bore 92a in sleeve 92. The sleeve is received in a bore 93 in motor housing 48. Bore 93, as shown in FIG. 8, is located directly below the bore 53 for the shuttle valve and also opens to the front of motor housing 48 so that it is closed at its forward end of plate 55. Plunger 91 extends forwardly through plate 55 and its front end is engaged by the pivotally mounted trigger 95 which can be operated by the finger of an operator holding the clinching tool by the pistol grip 23.

At the inner end of bore 93 is located spring 96 which biases plunger 91 outwardly to the closed position of the valve shown in FIG. 2. Finger pressure on trigger 95 moves plunger 91 inwardly to open the valve as shown in FIG. 7.

Sleeve 92 does not extend inwardly for the full length of bore 93 so that the inner end of the bore provides a manifold chamber 93a that can be placed in communication with bore 92a within the sleeve when the pilot valve is open. At the inner end of sleeve 92 is a beveled valve seat 92b which is adapted to cooperate with sealing ring 97 carried by plunger 91. When sealing ring 97 is in contact with beveled seat 92b, the valve is closed; but when the sealing ring is removed from seat 92b by inward movement of plunger 91 to the position shown in FIG. 7, the end of bore 93 is in communication through the open end of sleeve 92 with the annular space 98 formed inside the sleeve by the reduced diameter portion of plunger 91. A radial passageway in the sleeve communicates between the annular space 98 and an annular manifold groove 99 in the outer periphery of the sleeve. Groove 99 is aligned with port 84 referred to above. Port 84 is here shown as a portion of a transverse bore that intersects both bores 53 and 93 to place the space 98 within the pilot valve in communication with annular space 61 in the shuttle valve.

The inner end 93a of bore 93 is in communication with a passage 100 extending lengthwise through handle 23 and which is threaded at its outer end in order to receive a fitting from an air hose connected to a suitable source of operating fluid, i.e., compressed air, not shown in the drawings. Chamber 93a at the inner end of bore 93 is also in communication with port 101 in housing 48 which receives therefrom operating fluid under pressure, as will be more fully described.

It will be noted that the plunger has an intermediate section which is of the full diameter of bore 92a in the sleeve and is preferably a ground, lapped fit therein in order to provide a fluid-tight fit between the plunger and the sleeve. When the valve is open as shown in FIG. 7, this enlarged portion of plunger 91 covers the inner end of port 102 which opens to manifold groove 103 in the periphery of sleeve 92. This manifold groove communicates with an exhaust passage 104 which also extends longitudinally for the length of handle 23. When the trigger is released, spring 96 urges plunger 91 outwardly to seat sealing ring 97 on valve seat 92b in the position shown in FIG. 2 in which port 102 is uncovered by plunger 91, thereby placing the annular space 98 in communication through port 102 with manifold space 103 and exhaust passage 104.

Shuttle valve 50 serves as means for directing operating air under pressure alternately to opposite sides of drive piston 47 of the motor means. To do this, spool 51 of the shuttle valve is moved between the forward position shown in FIG. 3 and the rear position shown in FIG. 11. This movement of the spool is accomplished by endwise thrust applied to the spool by air under pressure in the cylinder spaces within the two ends of sleeve 52 in which the spool slides. As will be explained more fully, the movement of the spool is preferably accomplished by reducing air pressure at one end, thus allowing the air pressure at the other end to exert a relatively greater thrust on the spool which, like a piston, moves in response to that thrust. The reduction of air pressure at the ends of the spool is effected by opening exhaust or bleeder valves 110 and 111 located respectively at the forward and rearward ends of motor cylinder 46. Both of these valves are of identical construction and consequently detailed illustration of only one of them is considered essential, this being valve 111 shown in FIGS. 1 and 2. A third exhaust valve 112, likewise of the same construction, is also located at the rearward end of motor cylinder 46, as will be seen from FIGS. 10 and 11; but the purpose and operation of this valve will be described later.

Referring now to FIGS. 1 and 2, there is shown therein in section exhaust valve 111. Valve 111 consists of plunger 115 slidably mounted in a bore 114 in the portion of motor casing 48 forming the rear end wall of cylinder 46. Plunger 115 has a pair of spaced annular grooves at which are located fluid sealing elements, such as O-rings 116 and 117. Seal 116 provides a fluid-tight seal to prevent escape of operating fluid into or out of cylinder 46 through the bore in which plunger 115 moves, while seal 117 is adapted to engage a beveled surface at 118 at the rear end of the bore to retain air under pressure in the chamber 120 formed as an enlarged extension of bore 114.

At a position between the two seals 116 and 117, plunger 115 is provided with at least one radical bore 121 which opens to the inner end of the longitudinally extending discharge passage 122, the discharge passage opening to the atmosphere at the outer or rear end of plunger 115, as shown particularly in FIG. 2. When the valve is closed, as shown in FIG. 2, the air passage 121, 122 is closed to air either in cylinder 46 or in chamber 120 by the two air seals 116 and 117, respectively.

The valve is normally biased towards its closed position by compression spring 123 which abuts at one end a flange on plunger 115 and at the other end against screw plug 125 which is threaded to be received in a threaded section of the bore forming chamber 120 in motor housing 48. Plug 125 serves as a means for sealing chamber 120 from the atmosphere. Chamber 120 is in communication at port 126 in the motor housing and which is in communication with port 70 and the cylinder space at the rear end of spool 51 of the shuttle valve through an air passage, not shown, extending between the two ports. When the valve is open, air can pass from the rear end of the shuttle valve through port 70 and the intercommunicating passageway (FIG. 11) to port 126, thence into chamber 120; and it can escape from this chamber through the passages 121 and 122 in plunger 115, thus reducing the pressure at the rear end of the shuttle.

Exhaust valve 110 is constructed exactly as already described and illustrated in FIG. 2, except that it is in communication at its inlet port 130 (FIG. 11) with port 68 of the shuttle valve through a suitable interconnecting air passageway, port 68 being an outlet for the cylinder space at the forward end of spool 51. Thus when valve 110 is open, air is exhausted from the forward end of the shuttle valve through port 68, port 130, the intervening passageway, and discharge port 131 of the exhaust valve and the valve is shifted to the position of FIG. 3 by air pressure at the rear end.

Latch means are provided for stopping the drive piston in order to terminate the cycle of operation of the motor, this latch means operating to stop the piston at a desired point between the ends of its range of travel. Such means is illustrated in detail in FIGS. 4 and 6. The piston lock means is designated generally as 140 and comprises a double-acting free piston 141 which reciprocates in a transverse bore 142 located in motor housing 48. Piston 141 is closed at both ends so that the spaces between the ends of the piston 141 and bore 142 are cylinder spaces which, when filled with air under pressure, exert a thrust on the end faces of the piston body 141 to move the piston body 141 in the manner of a piston in a cylinder. The bore containing piston 141 extends entirely through motor housing 48 and is closed at opposite ends by caps 144 and 145. A fluid-tight fit between piston 141 and the wall of the surrounding bore is obtained by suitable sealing means, such as O-rings 146. Bore 142 is open centrally to cylinder space 46 and likewise piston body 141 is provided with a transverse opening at 148 extending entirely through it.

Slidably mounted in a longitudinally extending bore within piston body 141 is lock pin 150 which is normally biased toward the extended position by spring 151 which bears at one end against lock pin 150 and at the other end against a stationary abutment comprising a portion of piston 141. Pin 150 has an inclined ramp 150a against which strikes the similarly inclined end face of rod 47b, carried by piston 47, to limit piston travel. The rear wall of the cylinder housing is recessed at 46b to accommodate the rod 47b during a full rearward stroke. As will be seen from FIG. 6, pin 150 can retract from opening 148 but normally the end of the pin extends into opening 148 in the carrier under the influence of spring 151.

Piston 141 being shorter than the axial length of bore 142, the piston is free to reciprocate back and forth in the bore. At each end of the bore, the enclosed space becomes a cylinder space which, when filled with air under pressure, generates a thrust upon the end of piston 141. Thus by having a larger thrust on one end of the piston than on the other, the piston may be moved within the bore. For purposes of description, it will be spoken of as moving from right to left with reference to FIG. 6, which corresponds to the movement of the piston in the tool when viewed from the rear, or the right in FIG. 4.

Referring particularly to FIGS. 6 and 10, it will be seen that passage 155 admits and exhausts operating fluid at the right-hand end of the piston, passage 155 being connected to manifold space 120b of valve 112 for both inlet and exhaust of such operating fluid. Port 155 and manifold chamber 120b are supplied with air under pressure from port 101 through passage 157, seen in FIG. 9. This passage is in free communication with port 101 and consequently is continuously pressurized by air received through the main inlet passage 100, except downstream from flow restrictor 170 (FIG. 11) placed in the line just ahead of valve 112.

At the other end of piston 141, air under pressure is admitted to the cylinder space through port 158 which, through air passage 159, is in communication with port 78 in the shuttle valve. Like the shuttle valve, piston 141 is shifted from one end of its range of travel to the other by reducing the air pressure at the end of the piston toward which movement is desired. In order to reduce the air pressure at the right-hand end, the cylinder space there is in communication through port 156 with exhaust valve 112 which, when opened, exhausts air from the right-hand end of the piston 141 to the atmosphere through valve exhaust passage 160.

Not all of the air passages have been shown in detail in the drawings since their precise physical shape and location are of secondary importance in understanding the invention, the primary characteristic being where the passages begin and end. For this reason, all passages are shown only diagrammatically in FIGS. 11–17, and it is within the skill of those in the art to place the passages properly within the various parts of the tool, particularly within motor housing 48. It is customary in the industry to drill these passages from the outside of the housing, since they are small and cannot be successfully cored in a casting. The preferred practice is to drill a required pattern of bores which intersect or join one another to provide the desired passages, the unused ends of the passages being plugged where necessary to prevent escape of air to the atmosphere, as, for example, at 161 in FIG. 9.

*Operation*

Having described the structure of the illustrative form of the present invention, its operation will now be described with reference particularly to the diagrams constituting FIGS. 11–17 which illustrate in diagrammatic form the positions and movements of the various parts of the tool throughout a complete four-stroke operating cycle. Pressurized air passages are shown stippled for ease of disclosure.

The static position at the beginning of the cycle is illustrated in FIG. 11. In this position, spool 51 of the shuttle valve is rearwardly, pilot valve 90 is closed, and all the exhaust valves are closed. Inlet passage 100 is connected to a suitable source of operating fluid, normally air under pressure above atmospheric. From chamber 93a, air under pressure passes through port 101 to both the forward end of the shuttle valve and to the right-hand end of lock piston 141 as the interconnecting passages are continuously open and port 101 is always open to supply passage 100. Since the rear end of the shuttle valve and the left-hand end of lock piston 141 are now vented to atmosphere, the net thrust of air pressure is in a direction to hold the shuttle valve at the rear and the lock piston at the left positions.

Pressure on both sides of the main power piston 47 is reduced substantially to atmospheric since both sides of the piston are connected to open exhaust ports. Piston 47 initially occupies a mid-range position as in FIG. 11, which is preferably near, but not necessarily exactly at, the middle of its range of travel. The forward side is connected through manifold groove 76 of the shuttle valve sleeve to internal space 60 and thence through port 75 to exhaust passage 81. The rear side of the piston is connected through port 78 of the shuttle valve sleeve and internal annular groove 61 to port 84. This port now exhausts through the pilot valve space 98 and the main exhaust passage 104 directly to the atmosphere. The rear end of spool 51 of the shuttle valve is also in communication with a vent passage through passage 69, passage 71, annular groove 61, and port 84. It will also be noted in FIG. 11 that lock pin 150, although extended by spring 151, is out of engagement with piston extension 47b, as the thrust from air pressure on piston 141 is to the left.

The operating cycle is initiated by the operator pressing upon trigger 95 to move the pilot valve to the open position of FIG. 7.

When the pilot valve is opened as in FIG. 12, the first stroke of the piston commences, which is a forward half stroke. Opening the pilot valve allows operating fluid under pressure to flow from passage 100 past valve seat 92b, space 98, port 84, and sleeve groove 77 into annular space 61. From this manifold space, air under pressure can flow through passage 77 to the left-hand end of lock piston 141. Also, air can flow from port 78 into motor cylinder 46 at the rear side of motor piston 47, thus driving the piston forward. This forward movement of the piston is communicated through drive rod 21 to post 31 of the toggle mechanism, moving the post forwardly and thereby swinging jaws 25 toward each other.

From FIG. 12, it will also be seen that air under pressure from manifold space 61 can flow through restricted passage 71 to the interior of spool 51 and thence through bore 69 to the cylinder space at the end of the spool. Because the pressures at both ends of the shuttle valve spool are equal, the thrusts on the spool are balanced and consequently the spool stays in the rearward position while the power piston is being moved forwardly.

The forward end of the first stroke, which is only a half stroke because the piston travels from a mid-range position to the forward end of its full range of travel, the piston engages plunger 115 of exhaust valve 110, opening the valve and thereby exhausting to atmosphere the air under pressure at the forward end of spool 51 of the shuttle valve. Although the forward end of the shuttle valve is continuously in communciation with a source of air under high pressure, there is a restriction in the passage upstream from the end of the spool 51, as indicated at 162 in FIG. 12. This restriction allows operating fluid to continuously enter the space at the forward end of the shuttle valve but causes the pressure therein to drop sharply when air is being exhausted through valve 110 to the atmosphere. As a consequence, the thrust at the rear end of the piston due to operating fluid at the rear end of the piston becomes greater than the opposing thrust at the forward end of the spool and as a consequence the spool is moved from the rearward position of FIG. 12 to the forward position of FIG. 13.

This latter figure shows the position of the parts at the end of the first stroke and at the beginning of the second stroke which is a full rearward stroke. This rearward stroke is initiated by virtue of the forward shift in the position of the shuttle valve which has now placed the forward end of power cylinder 46 in communication with a source of operating fluid under pressure through port 83, manifold sleeve groove 76, and spool manifold space 61 which is continuously in communication with the source of pressure through passages 77 and 84. At the same time, the rearward portion of power cylinder 46 is exhausted by connecting it through sleeve groove 78 to annular space 62 around the spool which is also in communication with external groove 79 and exhaust passage 82 which opens at one end to the atmosphere.

Although the left-hand end of lock piston 141 has become pressurized through port 158 and passage 159 from spool manifold space 61, no movement of the piston takes place as yet because of the existence at the other end of at least an equal air pressure over an equal cross-sectional area on the piston.

With the conditions existing as shown in FIG. 13, drive piston 47 starts and continues through its second full stroke which is a stroke to the rear of cylinder 46. This movement of the piston produces a corresponding rearward movement of drive rod 21 which moves the ring feed blade 38 rearwardly of the stack of rings 14 in magazine 15, allowing another ring to move upwardly into the path of the ring feed blade. As drive rod 21 moves rearwardly, bow spring 32 brings the two pivot pins toward each other, thus forcing central pin 29 of the toggle mechanism rearwardly following closely behind the retreating drive rod. However, the range of movement of toggle pin 29 is less than that of the forward end of the drive rod so that the drive rod separates from the toggle mechanism during the latter part of the rearward movement. The rearward movement of the drive rod and the movement of the toggle mechanism just described cause jaws 25 to pivot about pins 26 in a direction to spread the jaws apart to the position of FIG. 5. However, the jaws can be forceably spread apart by engagement of drive rod pin 31 with the closed end of slot 30b.

The conditions existing immediately at the end of the first full stroke rearwardly are illustrated in FIG. 14. Operating fluid under pressure has filled that portion of the operating cylinder forwardly of the piston and the piston has now reached the end of its rearwardly stroke, bringing its rear face into contact with the plungers 115 of the two exhaust valves 111 and 112. The rearward movement of piston 47 moves plunger 115 simultaneously to a position to open the two exhaust valves 111 and 112. Valve 111 vents to atmosphere the cylinder space at the rear end of spool 51 of the shuttle valve. Although flow of operating fluid to the rear end of the spool is not shut off, the presence of restriction 71 allows reducing the pressure at the rear end by bleeding off to atmosphere the pressure therein through passage 70 and port 126 to discharge passage 122 of the valve. This reduces the pressure at the rear end of the valve spool, thereby allowing the relatively greater thrust from the higher pressure at the forward end of the spool to return the spool to the rearward position shown in FIG. 15.

Opening exhaust valve 112 reduces the pressure at the right-hand end of lock piston 141 by venting the cylinder space at the right-hand end to atmosphere and thereby reducing the pressure at that end of the piston. Restriction 170 in line 157 permits the sharp reduction of pressure at the piston while allowing limited flow of air from the pressurized line 157, thus eliminating need for a valve in the line. The thrust of the air pressure at the left-hand end is now able to overcome that at the right-hand end and move piston 141 to the right, reaching the position shown in FIG. 15 from the position shown in FIG. 14. In these two figures, it will be noticed that extension 47b of the piston has passed through the transverse opening 148 in the lock piston. However, the axial dimension of opening 148 is such as to permit shifting the double-acting piston 141 even when piston extension 47b extends through this opening. The shifting movement of the piston brings lock pin 150 into contact with the side face of piston extension 47b, as shown in FIG. 15. This movement, of course, compresses spring 151.

The rearward shift of spool 51 of the shuttle valve re-establishes the supply of operating fluid under pressure to cylinder 46 at the rear side of piston 47 and likewise re-establishes the exhaust from the forward side of the piston to the atmosphere at 81. The inflow of operating fluid to the motor cylinder drives the piston forward through its third stroke which is a full forward stroke and is initiated with the parts in the positions shown in FIG. 15. This stroke continues until the piston reaches the forward end of cylinder 46. As the piston moves forward from the rear end of the cylinder as in FIG. 15 to the forward end of the cylinder as in FIG. 16, piston extension 47b is withdrawn from transverse opening 148 in lock piston 141, thus allowing lock pin 150 to be urged forwardly under the influence of spring 151 to the position shown in FIG. 16 in which the lock pin is in the path of piston extension 47b.

At the end of the full forward stroke of piston 47, it again engages the plunger on exhaust valve 110, opening this valve to exhaust the operating fluid at the front end of spool 51 of the shuttle valve, in the same manner as described in connection with the forward half stroke. This reduction in pressure at the forward end of the spool results in the thrust from the air pressure at the rear end of the spool moving the spool forwardly to the position of FIG. 16.

FIG. 16 represents the conditions existing at the beginning of the last stroke which is a rearward half stroke of the drive piston 47. At this time, the forward shift of the shuttle valve spool has again re-established the supply of operating fluid under pressure through the shuttle valve ports and annular passages in the shuttle valve as previously described in connection with the beginning of the full rear stroke of the drive piston. Also, the motor cylinder at the rearward side of the drive piston has been reconnected to exhaust through the shuttle valve to vent to the atmosphere at outlet 82. The initial part of the return stroke of the piston is carried out in the same manner as the initial portion of the first full rear stroke; but now the difference in the operation arises through the intervention of means for terminating automatically the operating cycle of the motor means. This termination means is provided by the lock piston 141 and lock pin 150.

At the end of the full rear stroke (FIG. 14), lock piston 141 shifts to the right, as already mentioned. As the drive piston moves forwardly in FIG. 15, the piston extension 47b releases pin 150 and the pin is extended by spring 151 to the position of FIG. 16 in which pin 150 is in the path of the rearwardly moving piston projection 47b so that as the drive piston moves rearwardly, the end of extension 47b strikes against lock pin 150, as in FIG. 17, stopping further movement of motor piston 47. This action effectively stops the alternate movement of the piston forwards and backwards in power cylinder 46, bringing the parts into the terminal positions shown in FIG. 17 in which piston 47 is again in a mid-range position.

Summarizing this condition, the spool of the shuttle valve is forward, the power piston is stopped in mid-range with operating fluid being supplied to the forward side and the rear side being connected to the exhaust, all the exhaust valves are closed and the double-acting piston 141 is moved to the left position. These conditions are maintained as long as pilot valve 90 is held open by pressure on trigger 95. However, with the completion of the operating cycle, the operator releases trigger 95, allowing plunger 91 to move forwardly under the influence of spring 96, thus closing the pilot valve by seating sealing ring 97 against bevel seat 92b. This shuts off the supply of pressure fluid through the pilot valve to the shuttle valve and moves the pilot valve to the exhaust position shown in FIG. 12. In this position, all the ports in the shuttle valve are connected to exhaust, either through the pilot valve and passage 104 or through the two side vents 81 and 82. This restores the parts to the static position occupied at the beginning of each operating cycle as shown in FIG. 11.

Connecting port 77 of the shuttle valve to exhaust allows the left-hand end of the lock piston to be connected to exhaust, thus reducing the pressure at that end. As a result, the normal operating pressure applied to the right-hand end of the piston moves it to the left, shifting it from the position of FIG. 17 to that of FIG. 11. Passage 164 is an optional air transfer passage interconnecting the cylinder spaces at the two ends of piston 141 in a manner to avoid sluggish movement of the piston as a result of air trapped at the ends.

With the release of trigger 95, air pressure in front of the motor piston decays, approaching or reaching atmospheric. When this is reached, the pull of spring 151 disengages pin 150 from the end of rod 47b, moving piston 47 slightly forward. The slope of pin surface 150a is designed to hold the rod and pin in engagement until pressure ahead of the piston is no longer sufficient to produce any rearward movement of the motor piston, insuring that it stays in mid-range when released.

During the forward stroke of the drive piston, drive rod 21 brings bumper 49 against post 31, thus moving toggle pin 29 forwardly and causing toggle arms 28 to spread apart pins 27.

The range of travel of toggle pin 29 is less, perhaps about half, than the range of travel of piston drive rod 21. Hence the first forward stroke (half stroke) of the drive rod and the forward half of the rear full stroke operate to open and close jaws 25. Hence starting with piston 47 and rod 21 at some mid-range position, the rod advances to engage slide 30 and move toggle pin 29 to first contract or close the jaws. The retreating piston and rod then allow the spring 32 to open or spread apart jaws 25. However, if jaws 25 need power applied to spread them, this is accomplished at the end of the full rear stroke.

Preferably, but not necessarily, jaws 25 are about fully opened when first inserted in the metal lath 175 (FIGS. 4 and 5). Initially the jaws are opened and closed to engage strands of the metal lath and enlarge the opening by stretching, deforming or breaking the strands. With the exemplary tool described, power to do this is more readily available on the first stroke when power from piston 47 actuates the jaws. This first opening and closing of the jaws is a preliminary cycle for the express purpose of enlarging the openings. After this, the jaws can be advanced further into the enlarged openings.

This relative movement is shown in FIG. 5, as the movement of lath 175 and supporting channel 176 from the solid line to the dotted line position.

After this preliminary cycle, the retreating drive rod retracts ring feed plate 38 during the last half of the rear full stroke. On the succeeding advance, an open ring 14 is fed into the still open or spread apart jaws 25. At a suitable time, the operator, by thrust on the tool, advances it so that jaws 25 can clinch the ring around the support channel 176 and some elements of the metal lath to support the lath on the channel. The design of the ring and the clinching action are known in the art and need no detailed description here for that reason.

Instead of retracting the piston for a full stroke as has been the common practice with other known types of tools, the piston is stopped on its return stroke at a position intermediate the ends of its normal range of movement. This brings about several advantageous results. In the first place, the ring feed blade has not been retracted to the point where it can pick up another ring on its next forward movement of the drive rod. As a consequence, the next full cycle of motor operation starts with the preliminary cycle of opening and closing the jaws without a ring between them before the clinching cycle of opening and closing the jaws after feeding a ring between them.

Although the tool is described as operating on metal lath, it will be realized that the invention is not limited thereto and any open mesh netting may be fastened to a support member. There are various non-metallic nettings that may be stapled in this manner.

From the foregoing description, it will be understood that various changes in the specific details of construction and arrangement of the parts of the present invention may be made by persons skilled in the art without departing from the spirit and scope thereof. Accordingly, it is to be understood that the foregoing description is considered to be illustrative of, rather than limitative upon, the invention as defined by the appended claims.

We claim:

1. A tool for clinching a ring or staple, comprising:
a frame;
a ring clinching assembly on the frame including a pair of pivoted jaws for receiving and clinching a ring;
motor means operatively connected to the jaws;
and means energizing the motor means to operate the jaws through a cycle of opening and closing prior to receiving a ring to be clinched.

2. A tool for clinching a ring or staple, comprising:
a frame;
a ring clinching assembly on the frame including a pair of pivoted jaws for receiving and clinching a ring;
means for operating the jaws through a preliminary cycle of opening and closing the jaws;
means for feeding an open ring to the jaws after the preliminary cycle;
and means for operating the jaws through a ring clinching cycle after said preliminary cycle.

3. A tool for clinching a ring or staple, comprising:
a frame;
a ring clinching assembly on the frame including a pair of pivoted jaws for receiving and clinching a ring;
motor means operatively connected to the jaws;
means energizing the motor means to close and subsequently open the jaws;
means for feeding an open ring to the jaws while open;
and means energizing the motor means to close and open the jaws after operation of the ring feed means.

4. A tool for clinching a ring or staple, comprising:
a frame;
a ring clinching assembly on the frame including a pair of pivoted jaws for receiving and clinching a ring;
motor means including a reciprocating drive member coupled to the clinching assembly;
means starting the motor means with the drive member in a mid-range position to move to one end of its range of travel, then reverse for repeated strokes over the full range of travel;
and means to stop the drive member at substantially the mid-range starting position.

5. A tool for clinching a ring or staple, comprising:
a frame;
a ring clinching assembly on the frame including a pair of pivoted jaws for receiving and clinching a ring;
motor means including a piston and a reciprocating drive member coupling the piston to the clinching assembly;
means starting the motor means with the piston in a mid-range position and effective to advance the piston to one end of the range of piston travel and return it to the mid-range position;
means for feeding an open ring to the jaws;
and means actuating said ring feed means by said motor means after the piston has returned to said mid-range position.

6. A tool for clinching a ring or staple, comprising:
a frame;
a ring clinching assembly mounted on the frame and including a pair of pivoted jaws for receiving and clinching a ring;
motor means including a reciprocating drive member coupled to the assembly;
means automatically reversing the motor means during operation to operate the motor means through a multiple-stroke cycle of more than two strokes;
and manually operated means for initiating the motor cycle.

7. A tool according to claim 6 that also includes means for automatically terminating the motor means cycle with the drive member in a mid-range position.

8. A tool according to claim 6 that also includes means for automatically terminating the motor means cycle at a predetermined position of the drive member between the ends of its range of travel and while moving away from clinching position;
and means to restart the motor means driving the clinching assembly toward clinching position.

9. A tool for clinching a ring or staple, comprising:
a frame;
a ring clinching assembly mounted on the frame and including a pair of pivoted jaws for receiving and clinching a ring;
motor means including a reciprocating motor piston in a cylinder actuated by air pressure and connected to said assembly for actuating the assembly;
means directing operating air under pressure to said motor means alternately at opposite sides of the piston to drive the motor means through a multiple-stroke cycle of more than two strokes;
and manually operated means for initiating the cycle of the motor means.

10. A tool according to claim 9 that also includes latch means stopping the piston at a predetermined mid-range position between the extremes of its range of travel to terminate the cycle of motor operation.

11. A tool according to claim 9 in which the means directing air to the motor means includes shuttle valve and piston means on the valve for shifting the valve in response to air pressure applied to the piston means.

12. A tool according to claim 9 which also includes means actuated by travel of the motor means piston to control application of thrust to the shuttle valve by air pressure.

13. A tool according to claim 11 which also includes valve means responsive to extreme travel of the motor means piston to regulate the thrust of air pressure applied to the piston means on the shuttle valve.

14. A tool as in claim 9 in which the means for directing operating air to the motor means includes
a reciprocating shuttle valve;
means exerting a first thrust on the shuttle valve to move the valve in a first direction;
means exerting a second thrust on the shuttle valve to move the valve in the reverse direction;
and means to reduce each thrust independently and periodically whereby the shuttle valve is moved by the other thrust to shift periodically between two positions.

15. A tool according to claim 9 in which the last-mentioned means is operated by the motor piston at the extremes of its range of travel.

16. A tool for clinching a ring or staple, comprising:
a frame;
a ring clinching assembly mounted on the frame and including a pair of pivoted jaws for receiving and clinching a ring;
motor means including a reciprocating motor piston in a cylinder actuated by air pressure and connected to said assembly for actuating the assembly;
shuttle valve means movable between alternate positions;
passage forming means controlled by said shuttle valve directing operating air under pressure to opposite sides of the motor piston to reciprocate the piston;
second passage forming means directing operating air under pressure to the shuttle valve to move it between its alternate positions;

exhaust valve means adapted to reduce the air pressure applied to the shuttle valve at selected positions to shift the shuttle valve between its alternate positions, said exhaust valve means being actuated by the piston at the extremes of its range of travel;

and manually operated pilot valve means controlling flow of operating air under pressure in the first-mentioned passage forming means.

17. A tool according to claim 16 in which the pilot valve means also exhausts air pressure from one end of the shuttle valve means.

18. A tool according to claim 16 which also includes air pressure actuated means stopping the piston at a mid-range position between its extremes of travel.

19. A tool according to claim 16 which also includes motor piston lock means comprising
a cylinder and a double-acting piston therein;
a spring biased anvil on the last-mentioned piston;
air passage forming means directing operating air under pressure to opposite sides of the last-mentioned piston;
and exhaust valve means operable by the motor piston to reduce air pressure at one selected side of the double-acting piston to shift the double-acting piston in response to air pressure at the other end.

20. A tool for clinching a ring or staple, comprising:
a frame;
a ring clinching assembly mounted on the frame and including a pair of pivoted jaws for receiving and clinching a ring;
air motor means including a double-acting drive piston actuated by air under pressure drivingly coupled to the assembly;
air passage means directing operating air under pressure to opposite sides of the drive piston;
a shuttle valve movable between alternate positions controlling admission and exhaust of operating air from the motor means to reciprocate the drive piston;
and air pressure actuated means for shifting the shuttle valve, including piston means at each of two spaced positions on the shuttle valve, air passage means directing operating air to each of said last-mentioned piston means, and exhaust valve means selectively operable by the drive piston to exhaust the air at one of said piston means on the shuttle valve and thereby shift the shuttle valve in response to air pressure at the other piston means thereon.

References Cited by the Examiner

UNITED STATES PATENTS

| 2,921,315 | 1/1960 | Albrecht et al. | 72—407 |
| 3,066,304 | 12/1962 | Wantland | 72—407 |
| 3,160,890 | 12/1964 | Lefebvre | 29—243.56 X |

WILLIAM FELDMAN, *Primary Examiner.*

M. S. MEHR, *Assistant Examiner.*